United States Patent
Bali

(10) Patent No.: US 8,520,694 B1
(45) Date of Patent: Aug. 27, 2013

(54) MOBILE HANDSET POWER CONSERVATION USING CONNECTION-RELEASE BUFFERING

(75) Inventor: Soshant Bali, Menlo Park, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1002 days.

(21) Appl. No.: 12/533,733

(22) Filed: Jul. 31, 2009

(51) Int. Cl.
*H04L 12/54* (2006.01)
*H04B 7/185* (2006.01)

(52) U.S. Cl.
USPC .......................................... 370/428; 370/318

(58) Field of Classification Search
USPC ......................................................... 370/428
See application file for complete search history.

(56) References Cited

U.S. PATENT DOCUMENTS

| | | | |
|---|---|---|---|
| 2002/0045458 A1* | 4/2002 | Parantainen et al. | 455/466 |
| 2005/0078696 A1* | 4/2005 | Oner | 370/419 |
| 2006/0013257 A1* | 1/2006 | Vayanos | 370/473 |
| 2006/0034313 A1* | 2/2006 | Aaltonen | 370/432 |
| 2006/0221825 A1* | 10/2006 | Okano | 370/229 |
| 2007/0201413 A1* | 8/2007 | Laine et al. | 370/338 |
| 2008/0056133 A1* | 3/2008 | Deshpande et al. | 370/235 |
| 2008/0253282 A1* | 10/2008 | Kissel | 370/225 |
| 2009/0129399 A1* | 5/2009 | Malysh et al. | 370/410 |
| 2010/0211626 A1* | 8/2010 | Li | 709/203 |

* cited by examiner

*Primary Examiner* — Derrick Ferris
*Assistant Examiner* — Gerald Smarth

(57) ABSTRACT

Disclosed is a method and system in which a connection-release buffer is provided in a communication path over which data is transmitted between a computing device (such as a server) and a mobile station. Upon receiving a final packet, indicating that the server has no more data to send to the mobile station, the buffer operates to determine whether a set period of time has elapsed since the last application-data packet was either sent to or received from the mobile station. If so, the buffer retains the final packet until detecting that the mobile station is in connected mode, at which point the buffer forwards the final packet to the mobile station. If not, the buffer forwards the final packet to the mobile station without first buffering the final packet pending detection of the mobile station being in connected mode.

20 Claims, 4 Drawing Sheets

MOBILE HANDSET POWER CONSERVATION USING CONNECTION-RELEASE BUFFERING

BACKGROUND

The Transmission Control Protocol/Internet Protocol (TCP/IP) suite is a basic and common communication format of the Internet, and has a two-layer structure, which is a subset of the Open Systems Interconnection (OSI) reference model. The higher layer, TCP, manages the assembling of messages (e.g., files) into packets that are transmitted over the Internet and received by a TCP layer at the message's destination, which reassembles the packets back into the original message. The lower layer, IP, handles the addressing of each such packet to ensure that the packet reaches the correct destination. Often, TCP/IP uses a client/server model of communication, in which a computing device such as a mobile station (i.e., a client) requests and is provided a service by another computing device (i.e., a server).

TCP/IP is used by many Internet applications, including the World Wide Web (WWW), e-mail, File Transfer Protocol (FTP), Secure Shell, and some streaming media applications, among many other examples. In general, then, devices such as mobile stations may be arranged to execute data applications that use TCP to connect with other devices. When used by an upper-layer application, the TCP layer maintains what is known as a TCP connection to verify that all packets in a message have been properly received and acknowledged by their intended recipient. A TCP connection typically involves three phases: a connection-establishment phase, a data-transfer phase, and a connection-release phase. To establish a connection and thereby begin the connection-establishment phase, TCP uses a three-way handshake. This handshake comprises: (1) an active open (involving the client sending what is known as a SYN to the server), (2) in response, the server replies with what is known as a SYN-ACK, and (3) the client sends an ACK (acknowledgment) back to the server. At this point, both the client and the server have received an acknowledgement of the connection. After the connection has been established, data is transferred. The connection-release phase begins after the data has been transferred.

With respect to air-interface communications (using the physical and Media Access Control (MAC) layers of the OSI reference model to exchange packets assembled by TCP and addressed by IP), mobile stations generally have two modes of operation: (1) connected mode and (2) idle (or sleep) mode. In connected mode, a mobile station wirelessly transmits and/or receives application data. Furthermore, in connected mode, even if the mobile station is not transmitting or receiving any application data, its power consumption is relatively high as a result of power being used for transmitting and/or receiving signaling messages. When a mobile station is in connected mode and no application-data packets are transmitted or received for a timeout period such as a few seconds (i.e., until expiration of what is known as and referred to herein as a mobile station's inactivity timer, which is reset each time an application-data packet is sent or received), the mobile station will transition to idle mode to conserve power. The power consumption in idle mode is much lower than it is in connected mode, as no application-data packets are sent or received, and the number and frequency of signaling messages that are sent and received is small by comparison to connected mode.

OVERVIEW

There is typically a significant delay between the end of the data-transfer phase and the beginning of the connection-release phase, as data applications often do not initiate the connection-release phase for several tens of seconds after completing a data transfer. This delay unnecessarily increases mobile-handset power consumption, as mobile stations unnecessarily re-enter connected mode just to carry out the TCP connection-release phase.

According to the invention, an entity referred to herein as a connection-release buffer prevents a packet that would initiate the TCP connection-release phase from waking the mobile station from idle mode. A method of using connection-release buffering is provided, the method comprising a connection-release buffer that monitors application-data packets sent between a mobile station and a server. While monitoring the application-data packets, the connection-release buffer resets a timer in response to detecting each such application-data packet. If the connection-release buffer receives from the server a final packet, or: the buffer responsively checks the timer, and if the timer has expired, buffers the final packet until the buffer detects that the mobile station is in connected mode, at which point the connection-release buffer responsively forwards the final packet to the mobile station. If the timer has not expired, the buffer forwards the final packet to the mobile station without first buffering the final packet pending detection of the mobile station being in connected mode.

These as well as other aspects, advantages, and alternatives will become apparent to those of ordinary skill in the art by reading the following detailed description, with reference where appropriate to the accompanying drawings. Further, it should be understood that the foregoing overview, like other description and drawings provided throughout this document, is intended to illustrate the present method by way of example only.

BRIEF DESCRIPTION OF THE DRAWINGS

Various exemplary embodiments are described herein with reference to the following drawings, wherein like numerals denote like entities.

DETAILED DESCRIPTION

Figure 1:
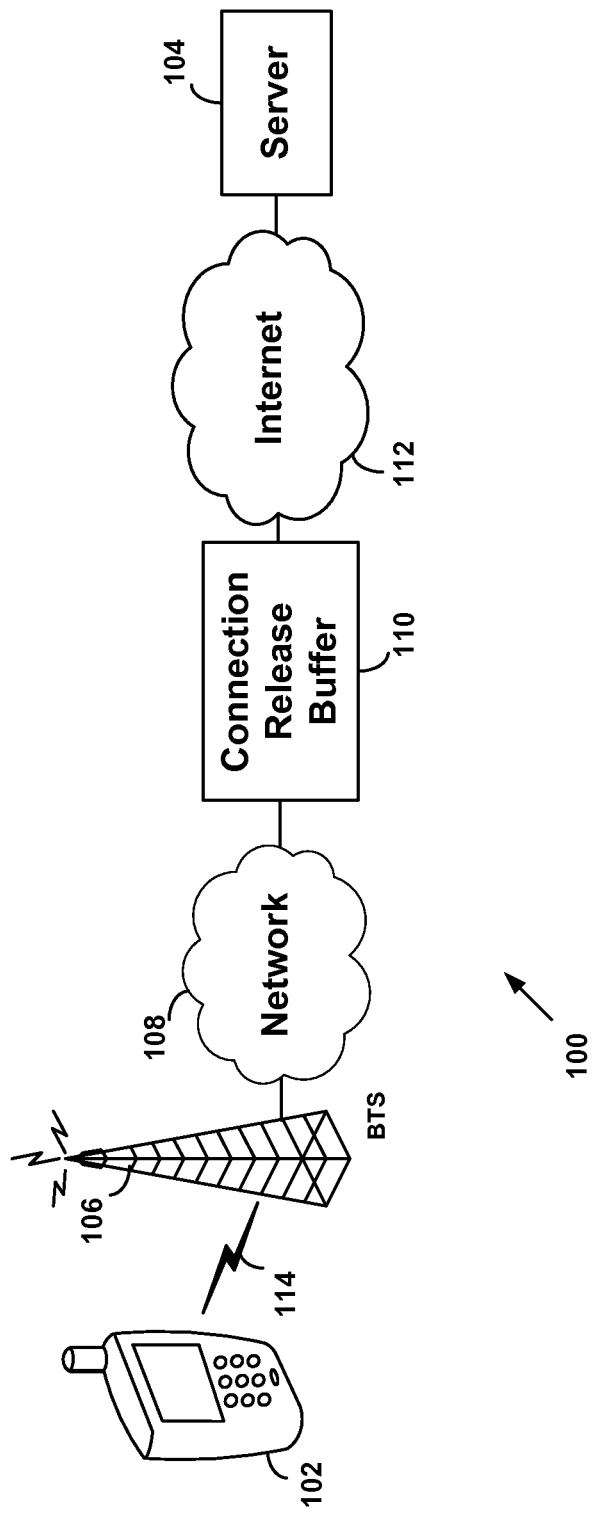
FIG. 1 is a simplified block diagram of a communication system in which exemplary embodiments can be implemented.

Referring to the drawings, as noted above, FIG. 1 is a simplified block diagram of an example communication system 100 in which exemplary embodiments can be implemented. In particular, FIG. 1 depicts a mobile station 102 and a server 104. Situated between mobile station 102 and server 104 is a representative communication path including a base transceiver station (BTS) 106, a network 108, a connection-release buffer 110, and an internet 112. Connection-release buffer 110 may be situated in or near a core network (e.g. network 108). In practice with this arrangement, when the server 104 sends a message destined for the mobile station 102, the message will pass via internet 112, through connection-release buffer 110, via network 108 and BTS 106, and over an air interface 114 to the destination mobile station 102.

In FIG. 1, server 104 is shown connected with internet 112, which in turn connects with connection-release buffer 110. Network 108 may be the above-mentioned core network, or another network. In general, server 104 is equipped to send TCP data that is to be delivered to a particular mobile station, such as the mobile station shown. To carry out the herein-described server functions, server 104 preferably takes the form of a computing/communication device, such as a personal computer, application server, a wireless client device (WCD), or other entity now known or later developed. Such an entity would typically include a processor programmed to generate and output messages comprising TCP packets, and a network communication interface through which to output the generated messages for transmission to a destination device such as mobile station 102.

Mobile station 102 may take various forms, examples of which include cell phones, personal digital assistants, wirelessly-equipped personal computers, and wirelessly-equipped appliances. Each mobile station 102 may be programmed with a plurality of applications, each of which serves a discrete device function that may or may not involve user interaction. Examples of such applications include, without limitation, phone calls, instant messaging, push-to-talk, word processing, phonebook, calendar, spreadsheet, games, audio player, video player, web browser, image management, graphics editing, utilities, and other applications now known or later developed. Note as well that the herein-described invention is not limited to communication with mobile stations, and may be used with other devices as well.

Figure 2:
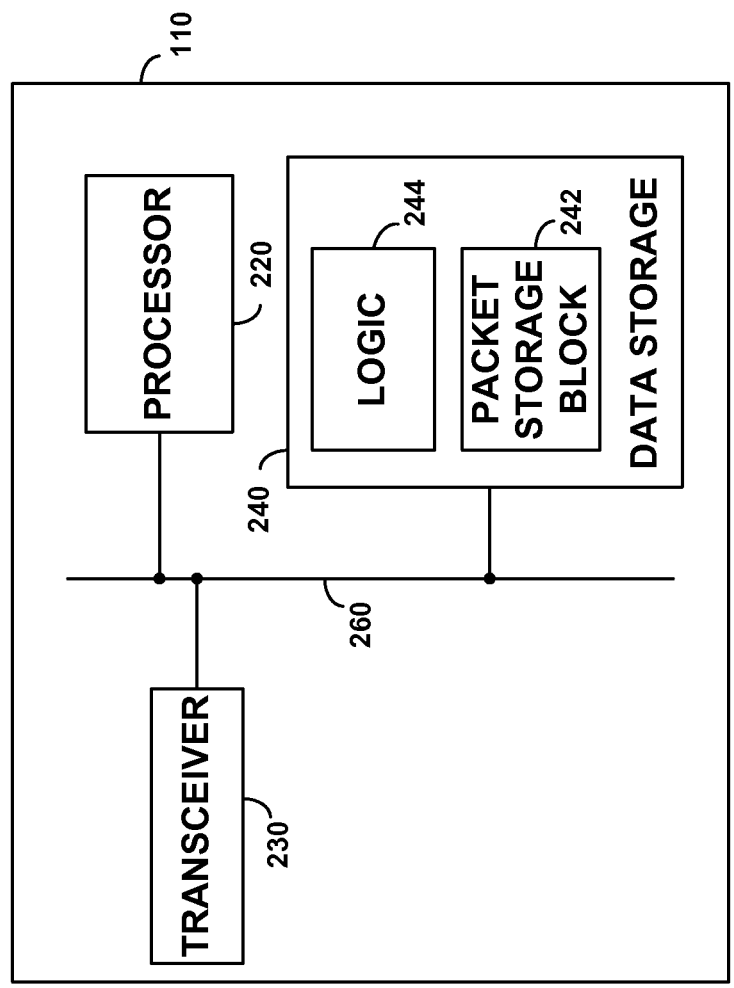
FIG. 2 is a simplified block diagram showing components of an exemplary connection-release buffer operable within the exemplary communication system.

Turning to FIG. 2, a simplified block diagram depicting functional components of an exemplary connection-release buffer is provided. As shown in FIG. 2, the buffer includes a processor 220, a transceiver 230, and data storage 240, all of which are coupled together by a system bus or other connection mechanism 260.

Processor 220 may comprise one or more general-purpose processors and/or one or more specialized processors (e.g., digital signal processors and/or application-specific integrated circuits). Transceiver 230 both receives and transmits application-data packets, among other data. Data storage 240 may comprise one or more volatile and/or non-volatile storage components, such as magnetic, optical, or organic storage, and may be integrated in whole or in part with processor 220. Data storage 240 may comprise a packet storage block 242 for storing intercepted TCP packets.

In an embodiment, as shown, data storage 240 also contains logic 244 executable by processor 220 to carry out various connection-release-buffer functions described herein. Data storage 240 and/or processor 220 may also comprise a resettable timer to measure the time since a last application-data packet was detected to or from a mobile station such as mobile station 102. The timer may have a reset value substantially equal to a reset value of a mobile station inactivity timer.

In an another embodiment, the connection-release buffer may be a software function that runs the hardware of an existing core network elements, such as for example a home agent, or a CSM gateway.

Figure 3:
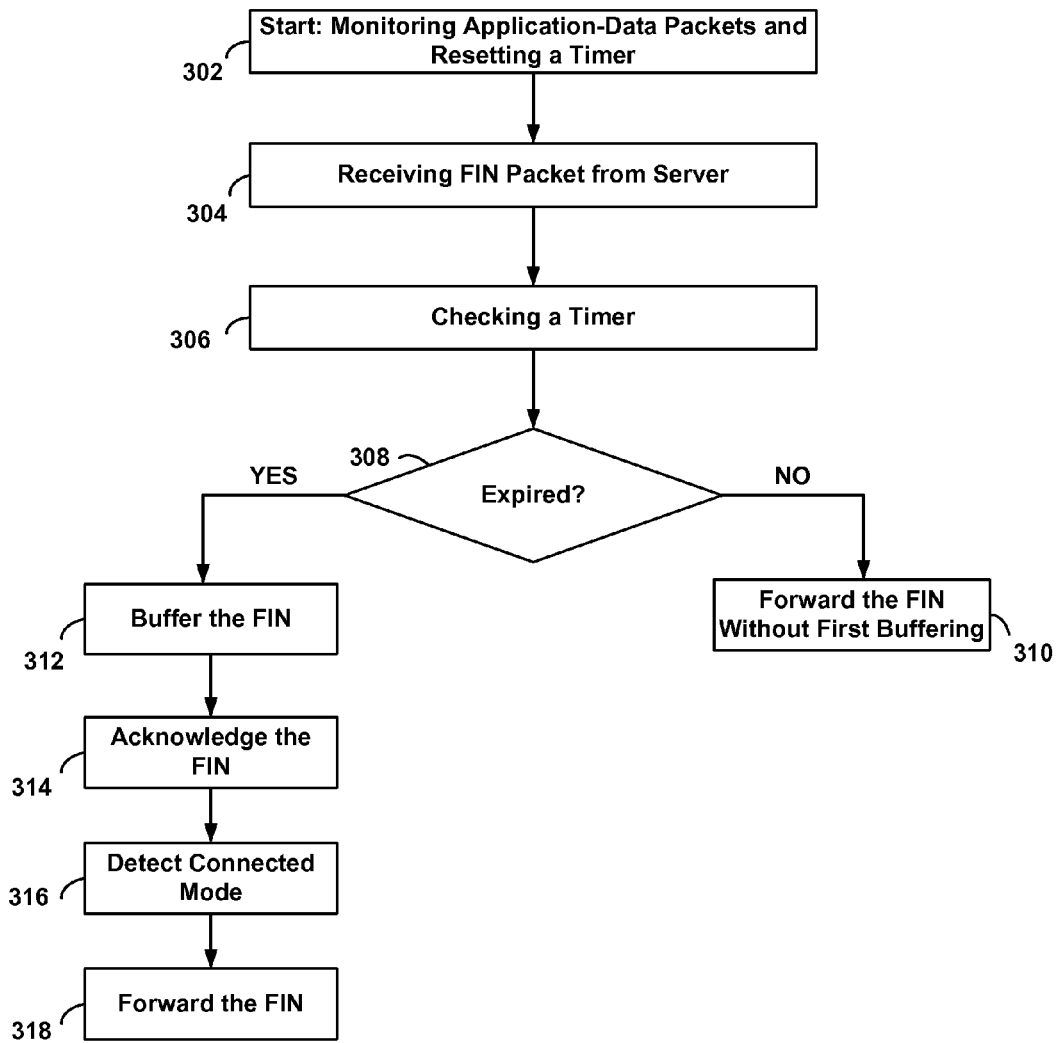
FIG. 3 is a flow chart depicting functions that can be carried out in accordance with exemplary embodiments.
Figure 4:
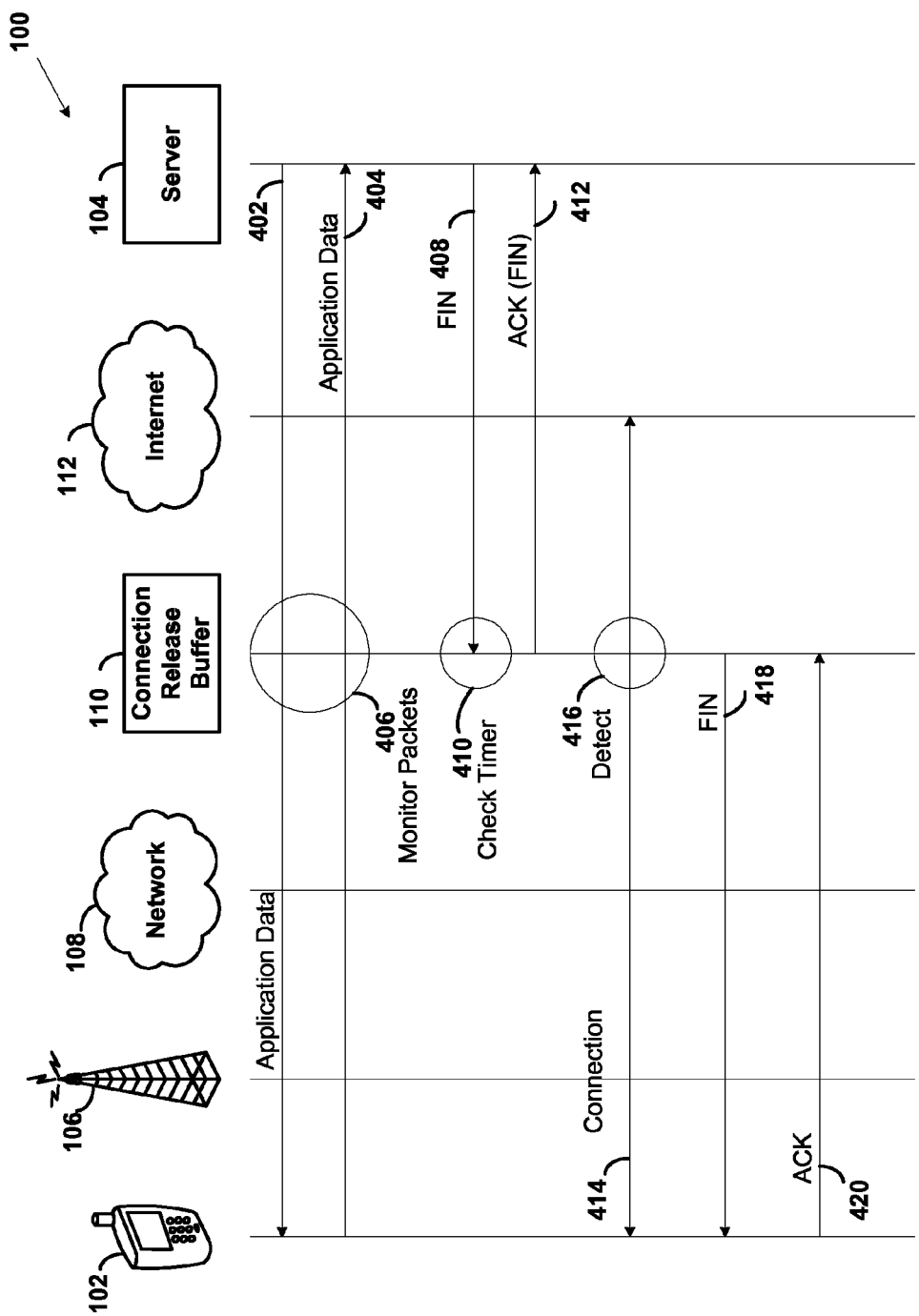
FIG. 4 is a message flow diagram, in accordance with exemplary embodiments.

FIGS. 3 and 4 depict examples of how the devices in the example system 100 may operate in accordance with the present invention. Note that FIGS. 3 and 4 assume a single TCP connection that is already in the data-transfer phase, which means that application data is being exchanged, and the handset is in connected mode.

As shown with arrows 402 and 404, the TCP client operates in data-transfer phase with server 104 sending application-data packets to mobile station 102 and mobile station 102 sending application-data packets to server 104, respectively. This is also shown at step 302 in FIG. 3. During this phase, connection-release buffer 110 monitors the packets sent to and from mobile station 102, shown at 406. The connection-release buffer 110 resets a timer in response to detecting each such application-data packet. In an alternate embodiment, the connection-release buffer 110 may also reset a timer in response to detecting FIN signals.

To signal the end of an application-data packet transmission, server 104 may send a final packet (e.g., a FIN signal) that is destined for mobile station 102, shown at 408. The final packet indicates to mobile station 102 that a particular transmission is finished. When the mobile station receives the final packet, the mobile station terminates the connection with the network, which comprises termination of the TCP connection release phase. Connection-release buffer 110 checks the timer, shown at 410 in FIG. 4, and also depicted at blocks 304 and 306 in FIG. 3. The connection-release buffer 110 determines whether the timer has expired, as depicted at block 308. If the timer has not expired, connection-release buffer 110 may forward the FIN signal to the mobile station 102, as shown at block 310 in FIG. 3. However, if the timer has expired, the connection-release buffer buffers the FIN signal, as depicted at block 312 in FIG. 3, and acknowledges the FIN signal, shown at block 314. If the connection-release buffer 110 buffers the FIN signal, buffer 110 may send a first acknowledgment packet to server 104, shown at 412. The timer's expiration may indicate that mobile station 102 has transitioned from connected mode to idle mode.

The connection-release buffer may retain the FIN signal until the buffer detects that mobile station 102 is in a connected mode, shown at 416. This is also depicted at block 316 in FIG. 3. The detection 416 may comprise detecting that mobile station 102 sent an application-data packet, shown at 414. Once connection-release buffer 110 detects that mobile station 102 is in connected mode, connection-release buffer 110 responsively forwards the FIN to the mobile station, shown at 418, and also depicted at block 318 in FIG. 3.

By the connection-release buffer 110 buffering the FIN signal, mobile station 102 is not transitioned from idle mode back to connected mode simply to receive notification that the transmission from server 104 is finished.

When mobile station 102 connects to internet 112 to exchange data, shown at 414, the connection-release buffer 110 detects this activity, indicating that the mobile station is now again in the connected state. Connection-release buffer 110 then forwards the buffered FIN packet to mobile station 102, shown at 418. Mobile station 102 responds to connection-release buffer 110 with a second acknowledgment packet (e.g., an ACK signal), shown at 420. Connection-release buffer 110 may then trash (e.g. delete, silently discard, etc.) the ACK after interception, since the connection-release buffer 110 already sent the first acknowledgment packet to server 104 in step 412.

The herein-described invention allows a mobile station to remain in idle mode for a longer period of time by not transitioning the mobile station to connected mode simply to receive a FIN packet. That is, the connection-release buffer is able to prevent the connection-release phase from increasing the overall connected-state duration of the mobile station. More power is used by the mobile station in connected mode than in idle mode, thus power is conserved by decreasing the time in connected mode. The connection-release phase is delayed until the mobile station transitions to connected mode for a reason other than merely to release a TCP connection.

An exemplary embodiment has been described above. Those of ordinary skill in the art will appreciate, however, that numerous variations can be made from the embodiment described, while remaining within the true scope and spirit of the invention as defined by the claims.

What is claimed is:

1. A method of using connection-release buffering, the method comprising:
   (a) a connection-release buffer monitoring application-data packets sent between a mobile station and a server, wherein the connection-release buffer is situated in a communication path between the mobile station and the server, wherein the communication path includes a wireless link between the mobile station and at least one base station;
   (b) while monitoring the application-data packets, the connection-release buffer resetting a timer in response to detecting each such application-data packet;
   (c) while monitoring the application-data packets, the connection-release buffer receiving from the server a final packet; and responsively:
      (i) checking the timer;
      (ii) if the timer has expired, buffering the final packet until detecting that the mobile station is in a connected mode, at which point the connection-release buffer responsively forwards the final packet to the mobile station; and
      (iii) if the timer has not expired, forwarding the final packet to the mobile station without first buffering the final packet pending detection of the mobile station being in the connected mode.

2. The method of claim 1, further comprising the connection-release buffer sending a first acknowledgment packet to the server in response to receiving the final packet.

3. The method of claim 2, further comprising the connection-release buffer receiving a second acknowledgment packet, wherein the mobile station sends the second acknowledgment packet to the connection-release buffer in response to receiving the final packet.

4. The method of claim 3, further comprising the connection-release buffer discarding the second acknowledgment packet.

5. The method of claim 1, wherein the final packet comprises a signal indicating that the server does not have any more data to send to the mobile station.

6. The method of claim 1, wherein the timer has a reset value substantially equal to a reset value of a mobile station inactivity timer, wherein the mobile station resets the mobile station inactivity timer each time the mobile station sends or receives an application-data packet, and wherein the mobile station transitions from the connected mode to an idle mode upon expiration of the mobile station inactivity timer.

7. The method of claim 1, wherein the connected mode comprises the mobile station in connection with a network.

8. The method of claim 7, wherein when the mobile station receives the final packet, the mobile station terminates the connection with the network.

9. The method of claim 8, wherein the termination of the connection with the network comprises termination of a TCP connection release phase.

10. The method of claim 1, wherein each of the application-data packets is a TCP packet.

11. A connection-release buffer, comprising:
    a transceiver;
    a processor;
    data storage; and
    program instructions stored in the data storage and executable by the processor for carrying out functions including:
    (a) the connection-release buffer monitoring application-data packets sent between a mobile station and a server, wherein the connection-release buffer is situated in a communication path between the mobile station and the server, wherein the communication path includes a wireless link between the mobile station and at least one base station;
    (b) while monitoring the application-data packets, the connection-release buffer resetting a timer in response to detecting each such application-data packet; and
    (c) while monitoring the application-data packets, the connection-release buffer receiving from the server a final packet; and responsively:
       (i) checking the timer;
       (ii) if the timer has expired, buffering the final packet until detecting that the mobile station is in a connected mode, at which point the connection-release buffer responsively forwards the final packet to the mobile station; and
       (iii) if the timer has not expired, forwarding the final packet to the mobile station without first buffering the final packet pending detection of the mobile station being in the connected mode.

12. The connection-release buffer of claim 11, wherein the connection-release buffer sends a first acknowledgment packet to the server in response to receiving the final packet.

13. The connection-release buffer of claim 12, wherein the connection-release buffer receives a second acknowledgment packet, wherein the mobile station sends the second acknowledgment packet to the connection-release buffer in response to receiving the final packet.

14. The connection-release buffer of claim 13, wherein the connection-release buffer discards the second acknowledgment packet.

15. The connection-release buffer of claim 11, wherein the final packet comprises a signal indicating that the server does not have any more data to send to the mobile station.

16. The connection-release buffer of claim 11, wherein the timer has a reset value substantially equal to a reset value of a mobile station inactivity timer, wherein the mobile station resets the mobile station inactivity timer each time the mobile station sends or receives an application-data packet, and wherein the mobile station transitions from the connected mode to an idle mode upon expiration of the mobile station inactivity timer.

17. The connection-release buffer of claim 11, wherein the connected mode comprises the mobile station in connection with a network.

18. The connection-release buffer of claim 11, wherein when the mobile station receives the final packet, the mobile station terminates the connection with the network.

19. The connection-release buffer of claim 18, wherein the termination of the connection with the network comprises termination of a TCP connection release phase.

20. The connection-release buffer of claim 11, wherein each of the application-data packets is a TCP packet.

* * * * *